United States Patent
Yao et al.

(10) Patent No.: US 12,538,144 B2
(45) Date of Patent: Jan. 27, 2026

(54) PERFORMANCE MEASUREMENTS RELATED TO PDU SESSION AND N4 SESSION MANAGEMENT

(71) Applicant: Apple Inc., Cupertino, CA (US)

(72) Inventors: Yizhi Yao, Chandler, AZ (US); Joey Chou, Scottsdale, AZ (US)

(73) Assignee: Apple Inc., Cupertino, CA (US)

( * ) Notice: Subject to any disclaimer, the term of this patent is extended or adjusted under 35 U.S.C. 154(b) by 464 days.

(21) Appl. No.: 17/283,636

(22) PCT Filed: Oct. 30, 2019

(86) PCT No.: PCT/US2019/058737
§ 371 (c)(1),
(2) Date: Apr. 8, 2021

(87) PCT Pub. No.: WO2020/092484
PCT Pub. Date: May 7, 2020

(65) Prior Publication Data
US 2021/0392519 A1 Dec. 16, 2021

Related U.S. Application Data

(60) Provisional application No. 62/753,550, filed on Oct. 31, 2018.

(51) Int. Cl.
*H04W 24/04* (2009.01)
*H04W 24/08* (2009.01)
(Continued)

(52) U.S. Cl.
CPC ........... *H04W 24/04* (2013.01); *H04W 24/08* (2013.01); *H04W 76/18* (2018.02); *H04W 80/06* (2013.01);
(Continued)

(58) Field of Classification Search
CPC ..... H04W 24/04; H04W 24/08; H04W 24/10; H04W 76/18; H04W 76/12; H04W 76/27;
(Continued)

(56) References Cited

U.S. PATENT DOCUMENTS 11,712,520 B2 * 8/2023 Lintereur ............ A61M 5/1723
604/504
2006/0176824 A1 * 8/2006 Laver ...................... H04L 41/00
370/241

(Continued)

FOREIGN PATENT DOCUMENTS

WO 2018009340 A1 1/2018
WO WO-2019133048 A1 * 7/2019 ........... H04B 17/318

OTHER PUBLICATIONS

3GPP TS 28552 V15.0.0, 3GPP; TSGSA; Management and orchestration; 5Gperformance measurements (Release15), Sep. 21, 2018 (Year: 2018).*

(Continued)

*Primary Examiner* — Un C Cho
*Assistant Examiner* — Rasha K Fayed
(74) *Attorney, Agent, or Firm* — Eschweiler & Potashnik, LLC; Matthew Glause

(57) ABSTRACT

Techniques discussed herein can facilitate generation of performance managements associated with one or more of PDU (Protocol Data Unit) session(s) and/or N4 session(s). One example embodiment is an apparatus configured to be employed in a service provider for a component of a Fifth Generation Core Network (5GC), comprising: a memory interface; and processing circuitry configured to: obtain one or more raw performance measurements from the component of the 5GC; and generate one or more performance measurements for the component of the 5GC based on the one or more raw performance measurements, wherein the one or more raw performance measurements and the one or (Continued)

more performance measurements are associated with one or more of a PDU (Protocol Data Unit) session or a N4 session.

20 Claims, 4 Drawing Sheets

(51) Int. Cl.
  *H04W 28/02* (2009.01)
  *H04W 76/18* (2018.01)
  *H04W 80/06* (2009.01)
  *H04W 88/18* (2009.01)
(52) U.S. Cl.
  CPC ........ *H04W 28/0268* (2013.01); *H04W 88/18* (2013.01)
(58) Field of Classification Search
  CPC ..... H04W 76/11; H04W 76/15; H04W 80/06; H04W 80/02; H04W 80/04; H04W 80/10; H04W 28/0268; H04W 28/0236; H04W 28/08; H04W 28/086; H04W 28/0925; H04W 28/10; H04W 28/0231; H04W 28/02; H04W 28/0226; H04W 88/18; H04W 84/042; H04W 84/12; H04W 4/24; H04W 4/80; H04W 4/023; H04W 4/025; H04W 60/00; H04W 60/02; H04W 68/005; H04W 8/08; H04W 8/18; H04W 8/24; H04W 8/06; H04W 8/02; H04L 12/14; H04L 12/1407; H04L 43/0882; H04L 43/08; H04L 43/12; H04L 43/04; H04L 43/062; H04L 43/026; H04L 47/20; H04L 67/148; H04L 67/51; H04L 65/61; H04L 65/80; H04L 41/0806; H04L 41/5009; H04L 61/5007; H04L 61/6063; H04L 2102/663; H04M 15/00; H04M 15/62; H04M 15/66; H04M 15/8016; H04M 15/8228
  See application file for complete search history.

(56) References Cited

U.S. PATENT DOCUMENTS

| | | | | |
|---|---|---|---|---|
| 2007/0070969 | A1* | 3/2007 | Malomsoky | H04W 24/08 370/345 |
| 2009/0310501 | A1* | 12/2009 | Catovic | H04W 24/08 370/252 |
| 2018/0192472 | A1* | 7/2018 | Callard | H04L 49/9063 |
| 2018/0270782 | A1* | 9/2018 | Park | H04W 60/06 |
| 2018/0359795 | A1* | 12/2018 | Baek | H04L 67/14 |
| 2019/0159048 | A1* | 5/2019 | Feldkamp | H04L 43/08 |
| 2019/0215731 | A1* | 7/2019 | Qiao | H04W 24/06 |
| 2019/0246282 | A1* | 8/2019 | Li | H04W 12/033 |
| 2019/0253917 | A1* | 8/2019 | Dao | H04W 28/0268 |
| 2019/0313478 | A1* | 10/2019 | Huang-Fu | H04L 67/143 |
| 2019/0356557 | A1* | 11/2019 | Burgio | H04L 41/5009 |
| 2019/0394833 | A1* | 12/2019 | Talebi Fard | H04W 68/005 |
| 2020/0107213 | A1* | 4/2020 | Park | H04L 41/0806 |
| 2020/0112907 | A1* | 4/2020 | Dao | H04W 28/0268 |
| 2020/0170071 | A1* | 5/2020 | Mildh | H04W 80/08 |
| 2021/0014734 | A1* | 1/2021 | Liu | H04W 28/0942 |
| 2021/0022099 | A1* | 1/2021 | Kumar | H04W 76/12 |
| 2021/0029770 | A1* | 1/2021 | Ying | H04W 76/12 |
| 2021/0105657 | A1* | 4/2021 | Hu | H04W 28/0268 |
| 2021/0112841 | A1* | 4/2021 | Xin | H04M 15/58 |
| 2021/0153070 | A1* | 5/2021 | Velev | H04W 28/0268 |
| 2021/0168643 | A1* | 6/2021 | Yao | H04W 24/08 |
| 2021/0194634 | A1* | 6/2021 | Sedlacek | H04L 1/1671 |
| 2021/0234929 | A1* | 7/2021 | Zhao | H04W 12/121 |
| 2022/0046752 | A1* | 2/2022 | Lee | H04W 76/40 |
| 2022/0321435 | A1* | 10/2022 | Yao | H04W 24/08 |

OTHER PUBLICATIONS

PCT Search Report dated Feb. 19, 2020 in connection with PCT Application No. PCT/US2019/058737.
PCT Written Opinion dated Feb. 19, 2020 in connection with PCT Application No. PCT/US2019/058737.
3GPP TS 28.552 V15.0.0, "3GPP; TSG SA; Management and Orchestration; 5G performance measurements (Release 15)", Sep. 21, 2018, See Sections 1, 5.4; and annex A14.
3GPP TS 32.404 V15.0.0, "3GPP; TSG SA; Telecommunication management; Performance Management (PM); Performance Measurements; Definitions and Template (Release 15)"; Jun. 21, 2018; See sections 3.3-3.6.
Huawei, et al.; "Update ATSSS path performance measurement function of solution 3", S2-1810507; 3GPP TSG-SA WG2 Meeting #129, Oct. 9, 2018; See Section 2.
3rd Generation Partnership Project; Technical Specification Group Services and System Aspects; Vocabulary for 3GPP Specifications; (Release 15); 3GPP TR 21.905 V15.0.0 (Mar. 2018); http://www.3gpp.org.
3rd Generation Partnership Project; Technical Specification Group Services and System Aspects; Telecommunication management; Performance Management (PM); Concept and requirements (Release 15); 3GPP TS 32.401 V15.0.0 (Jun. 2018); http://www.3gpp.org.
3rd Generation Partnership Project; Technical Specification Group Services and System Aspects; System Architecture for the 5G System; Stage 2 (Release 15); 3GPP TS 23.501 V15.3.0 (Sep. 2018); http://www.3gpp.org.
P. Chimento; JHU Applied Physics Lab; J. Ishac; NASA Glenn Research Center; Defining Network Capacity; Network Working Group; Request for Comments: 5136; Category: Informational; Feb. 2008.
3rd Generation Partnership Project; Technical Specification Group Radio Access Network; NG-RAN; F1 application protocol (F1AP); (Release 15); 3GPP TS 38.473 V15.3.0 (Sep. 2018); http://www.3gpp.org.
3rd Generation Partnership Project; Technical Specification Group Services and System Aspects; Procedures for the 5G System; Stage 2 (Release 15); 3GPP TS 23.502 V15.3.0 (Sep. 2018); http://www.3gpp.org.
3rd Generation Partnership Project; Technical Specification Group Services and System Aspects; Telecommunication management; Management and orchestration; 5G end to end Key Performance Indicators (KPI); (Release 15); 3GPP TS 28.554 V15.0.1 (Sep. 2018); http://www.3gpp.org.
3rd Generation Partnership Project; Technical Specification Group Services and System Aspects; Telecommunication management; Performance Management (PM); Performance measurements; Evolved Universal Terrestrial Radio Access Network; (E-UTRAN); (Release 15); 3GPP TS 32.425 V15.1.0 (Jun. 2018); http://www.3gpp.org.
3rd Generation Partnership Project; Technical Specification Group Services and System Aspects; Telecommunication management; Key Performance Indicators (KPI) for Evolved Universal Terrestrial Radio Access Network (E-UTRAN); Requirements; (Release 15); 3GPP TS 32.451 V15.0.0 (Jun. 2018); http://www.3gpp.org.
3rd Generation Partnership Project; Technical Specification Group Core Network and Terminals; 5G System; Session Management Services; Stage 3 (Release 15); 3GPP TS 29.502 V15.1.0 (Sep. 2018); http://www.3gpp.org.
3rd Generation Partnership Project; Technical Specification Group Core Network and Terminals; Interface between the Control Plane and the User Plane Nodes; Stage 3 (Release 15); 3GPP TS 29.244 V15.3.0 (Sep. 2018); http://www.3gpp.org.
International Preliminary Report on Patentability dated Apr. 27, 2021 in connection with PCT Application No. PCT/US2019/058737.

* cited by examiner

PERFORMANCE MEASUREMENTS RELATED TO PDU SESSION AND N4 SESSION MANAGEMENT

REFERENCE TO RELATED APPLICATIONS

This application is a National Phase entry application of International Patent Application No. PCT/US2019/058737 filed Oct. 30, 2019, which claims the benefit of U.S. Provisional Patent Application No. 62/753,550 filed Oct. 31, 2018, entitled "PERFORMANCE MEASUREMENTS RELATED TO PDU SESSION AND N4 SESSION MANAGEMENT", the contents of which are herein incorporated by reference in their entirety.

BACKGROUND

Mobile communication has evolved significantly from early voice systems to today's highly sophisticated integrated communication platform. The next generation wireless communication system, 5G (or new radio (NR)) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP (Third Generation Partnership Project) LTE (Long Term Evolution)-Advanced with additional potential new Radio Access Technologies (RATs) to enrich people lives with better, simple and seamless wireless connectivity solutions. NR will enable everything connected by wireless and deliver fast, rich contents and services.

DETAILED DESCRIPTION

Embodiments described herein can be implemented into a system using any suitably configured hardware and/or software. In various aspects, embodiments discussed herein can facilitate generation and/or communication of performance measurements associated with one or more of a PDU (Protocol Data Unit) session and/or a N4 session.

Figure 1:
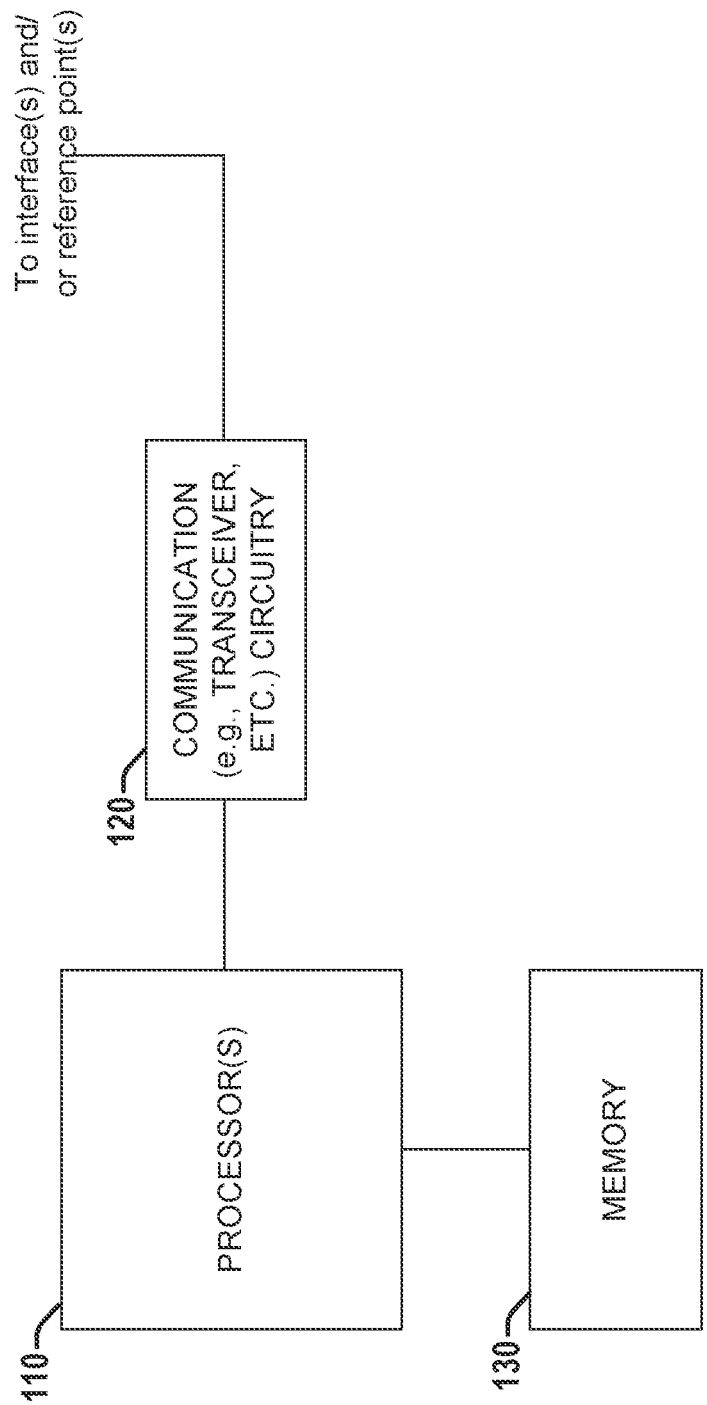
FIG. 1 is a block diagram illustrating a system that facilitates generation and/or communication of performance measurements associated with one or more of a PDU (Protocol Data Unit) session and/or a N4 session, in accordance with various embodiments discussed herein.

Referring to FIG. 1, illustrated is a block diagram of a system 100 employable at a UE (User Equipment), a next generation Node B (gNodeB or gNB) or other BS (base station)/TRP (Transmit/Receive Point), or a component of a 3GPP (Third Generation Partnership Project) network (e.g., a 5GC (Fifth Generation Core Network)) component such as a UPF (User Plane Function)) that facilitates generation and/or communication of performance measurements associated with one or more of a PDU (Protocol Data Unit) session and/or a N4 session, in embodiments. System 100 can include processor(s) 110 comprising processing circuitry and associated interface(s) (e.g., a communication interface for communicating with communication circuitry 120, a memory interface for communicating with memory 130, etc.), communication circuitry 120 (e.g., comprising circuitry for wired and/or wireless connection(s), e.g., transmitter circuitry (e.g., associated with one or more transmit chains) and/or receiver circuitry (e.g., associated with one or more receive chains), wherein transmitter circuitry and receiver circuitry can employ common and/or distinct circuit elements, or a combination thereof), and a memory 130 (which can comprise any of a variety of storage mediums and can store instructions and/or data associated with one or more of processor(s) 110 or transceiver circuitry 120). Specific types of embodiments (e.g., UE embodiments) can be indicated via subscripts (e.g., system $100_{UE}$ comprising processor(s) $110_{UE}$, communication circuitry $120_{UE}$, and memory $130_{UE}$). In BS embodiments (e.g., system $100_{gNB}$) and network component (e.g., UPF (User Plane Function), etc.) embodiments (e.g., system $100_{UPF}$) processor(s) $110_{gNB}$ (etc.), communication circuitry $120_{gNB}$ (etc.), and memory $130_{gNB}$ (etc.) can be in a single device or can be included in different devices, such as part of a distributed architecture. In embodiments, signaling or messaging between different embodiments of system 100 (e.g., 1001 and 1002) can be generated by processor(s) $110_1$, transmitted by communication circuitry $120_1$ over a suitable interface or reference point (e.g., N4, etc.), received by communication circuitry $120_2$, and processed by processor(s) $110_2$.

A PDU (Protocol Data Unit) session may need to be modified by various causes (for example, as discussed in 3GPP TS (Technical Specification) 29.502), whether a PDU session can be successful modified can impact the communication services supported by the PDU session. Thus, it can be advantageous to monitor the performance of PDU session modification procedures. In addition to PDU session modification requests and successes, it can also be advantageous to monitor the PDU session modification failures with specific causes for trouble shooting.

Figure 2:
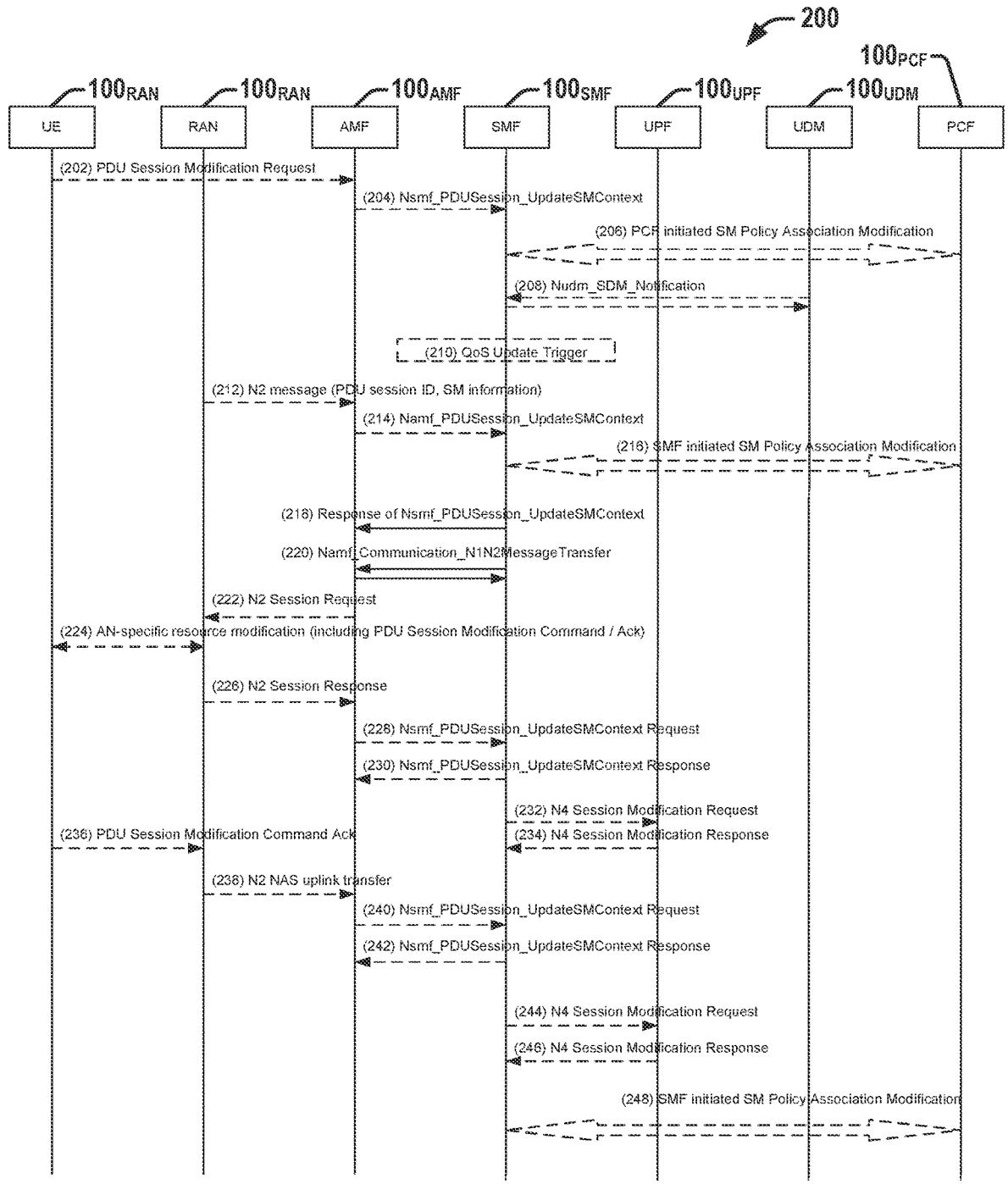
FIG. 2 is a diagram illustrating an example a PDU session modification procedure (for non-roaming and roaming with local breakout), in connection with various aspects discussed herein.

In addition, the PDU session modification can add or modify QoS (Quality of Service) flows, which directly impacts the QoS of the network and the QoE (Quality of Experience) of the end users. Thus, it can additionally be advantageous to monitor the number of requests to add/modify QoS flows and the number of QoS flows successfully added/modified. Referring to FIG. 2, illustrated is a PDU session modification procedure 200 (for non-roaming and roaming with local breakout), in connection with various aspects discussed herein. FIG. 2 indicates actions 202-248 of a PDU session management procedure 200 that can be performed by and/or between a UE (e.g., employing system $100_{UE}$), RAN (Radio Access Network) (e.g., employing system $100_{RAN}$), AMF (Access Management Function) (e.g., employing system $100_{AMF}$), SMF (Session Management Function) (e.g., employing system $100_{SMF}$), UPF (User Plane Function) (e.g., employing system $100_{UPF}$), UDM (Unified Data Management) (e.g., employing system $100_{UDM}$), and PCF (Policy Control Function) (e.g., employing system $100_{PCF}$).

The PDU session can be released by the UE (e.g., by system $100_{UE}$), SMF (e.g., by system $100_{SMF}$), or AMF (e.g., by system $100_{AMF}$). When a PDU session is released for an unexpected reason, the user service can be impacted. PDU session releases initiated by the UE and SMF are usually triggered by normal reasons (e.g., UE deregistration, under request from DN (Data Network), etc.). On the other hand, PDU session releases initiated by AMF may be due to an abnormal reason (e.g., mismatch of PDU Session status between UE and AMF, etc.). Thus, it can also be advantageous to monitor PDU session releases initiated by AMF.

The UPF (e.g., via system $100_{UPF}$) handles the user plane path of PDU Sessions. UPF selection is performed by SMF (e.g., via system $100_{SMF}$), and deployments where a UPF is controlled either by a single SMF or multiple SMFs (for different PDU Sessions) are supported.

The SMF uses N4 session management procedures to control the traffic detection, traffic reporting, QoS enforcement and traffic routing of the UPF.

The N4 session management procedures comprise a N4 Session Establishment procedure, a N4 session Modification procedure and a N4 session release procedure.

If the UPF fails to handle the user plane path for a PDU session, the user service will be impacted. Thus, it is also advantageous to monitor the performance of N4 session management.

Various embodiments can generate and/or communicate performance measurements related to PDU session modification, PDU session release for SMF, and performance measurements related to N4 session establishment for UPF.

The performance measurements for PDU session modification and PDU session release SMF, and performance measurements for N4 session establishment discussed herein can allow for the ability to monitor performance related to resource allocation for 5GC, thereby facilitating more efficient resource allocation.

Figure 3:
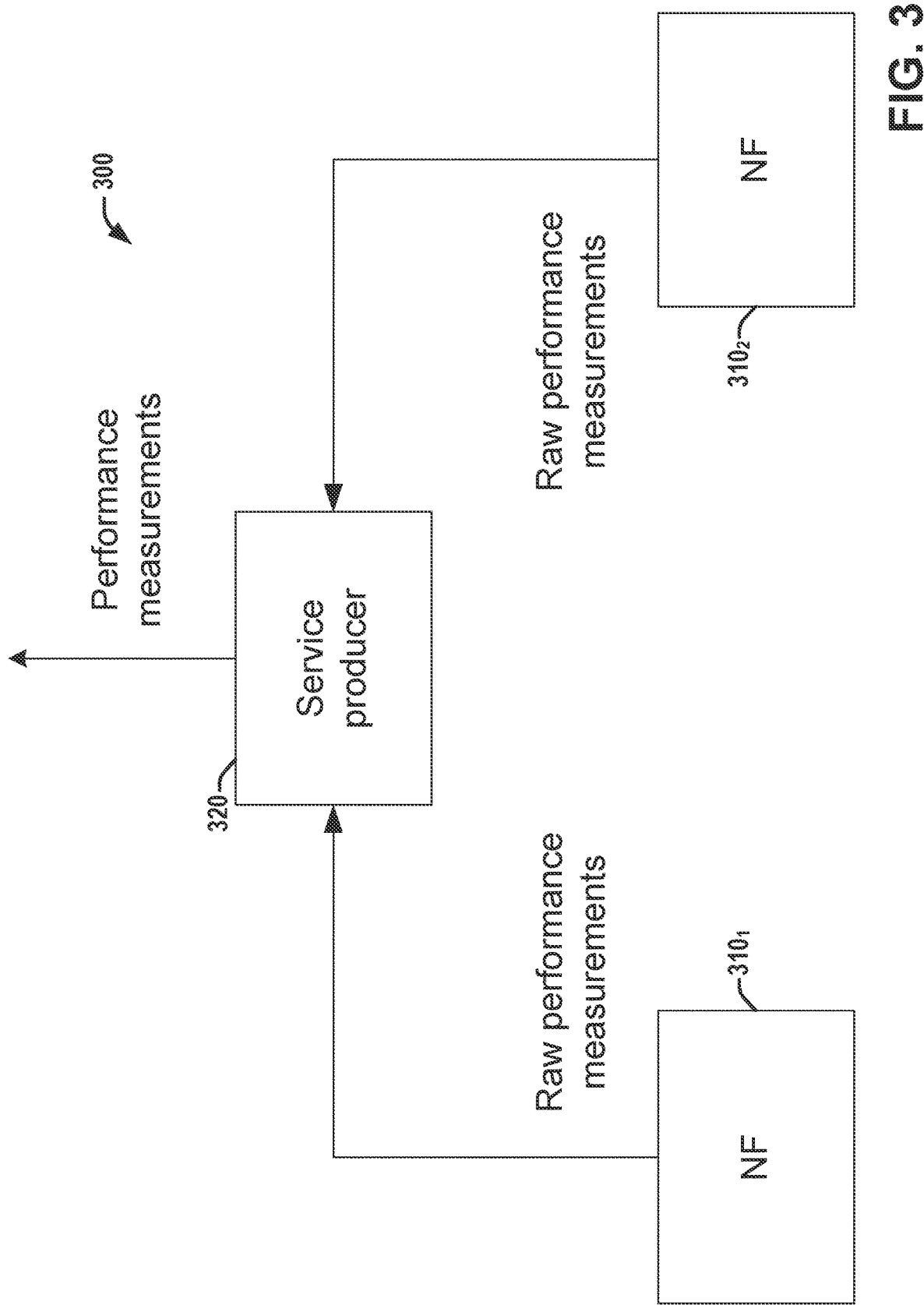
FIG. 3 is a diagram illustrating an example flow for generating performance measurements related to one or more of PDU session modification, PDU session release, or N4 session establishment, according to various aspects discussed herein.

Referring to FIG. 3, illustrated is a diagram showing a flow 300 for generating performance measurements related to one or more of PDU session modification, PDU session release, or N4 session establishment, according to various aspects discussed herein. Network Function(s) (NF(s)) $310_i$ can generate raw performance measurements (e.g., related to one or more of PDU session modification, PDU session release, or N4 session establishment). A service producer 320 can collect the raw performance measurements from NF(s) $310_i$, and based on the raw performance measurements, service producer 320 can generate performance measurements (e.g., standard-compliant and/or according to aspects described herein, etc.) for NF(s) $310_i$ for consumer(s) of service producer 320. In some embodiments, service producer 320 can be a separate entity from NF(s) $310_i$, while in other embodiments, a NF $310_i$ can comprise the associated service producer 320, such that the process of generating performance measurements from raw performance measurements occurs within that NF $310_i$.

In various embodiments, the NF(s) $310_i$ (and service producer 320) can be any of a variety of NFs $310_i$ (and service producers 320), such as UPF, SMF, etc., which can depend on the nature of the specific performance measurement generated from the specific raw performance measurements.

Figure 4:
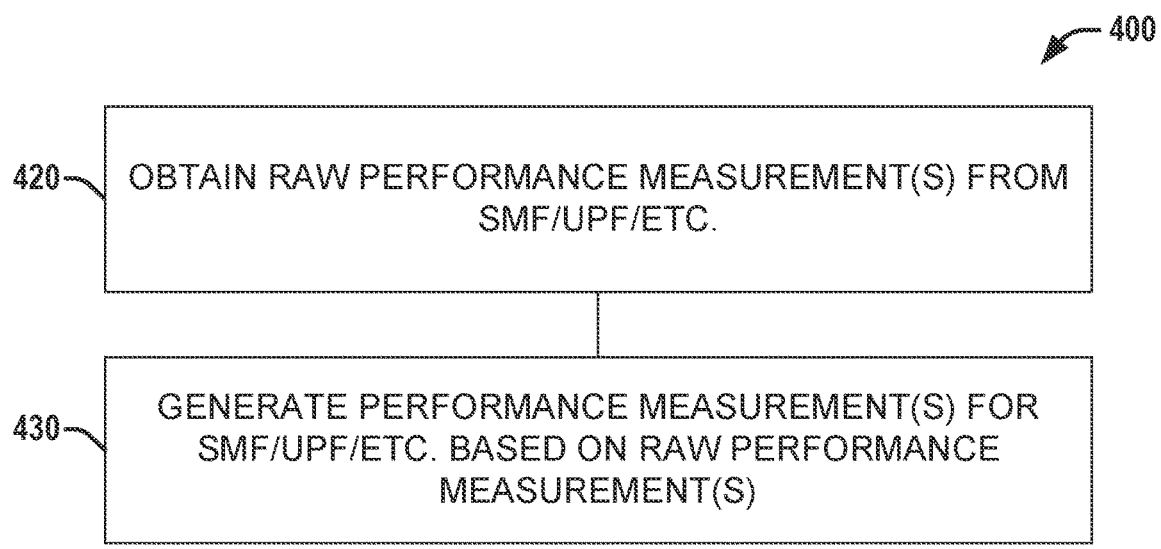
FIG. 4 is a flow diagram illustrating an example method employable at a service provider for generating performance measurements related to one or more of PDU session modification, PDU session release, or N4 session establishment, according to various aspects discussed herein.

Referring to FIG. 4, illustrated is a flow diagram of an example method 400 employable at a service producer (e.g., of a 5GC (Fifth Generation Core Network) Component) that facilitates generation of one or more performance measurements based on raw performance measurement(s) generated by one or more network functions, according to various aspects discussed herein. In other aspects, a machine-readable medium can store instructions associated with method 400 that, when executed, can cause a service producer to perform the acts of method 400.

At 410, one or more raw performance measurements can be obtained (e.g., via one or more associated network functions, etc.), for example, from one or more SMFs, UPFs, etc.

At 420, one or more performance measurements can be generated from the raw performance measurements, wherein the one or more performance measurements are associated with one or more of PDU session modification, PDU session release, or N4 session establishment.

Additionally or alternatively, method 400 can include one or more other acts described herein in connection with generating and/or communicating performance measurements, according to various aspects.

Performance Measurements

Each of the performance measurements discussed herein is described based on the measurement definition template of 3GPP TS 32.404, which indicates the measurement name in the clause header, followed by letter-indexed subclauses. The meaning of these subclauses and details relevant to performance measurements discussed herein are provided in the following summary and example of the modified template form used herein:

C.x.y Measurement Name (clause header) [a descriptive name of the measurement type specified as clause C.x.y of a relevant 3GPP TS or 3GPP TR (Technical Report); potential/placeholder clause identifiers are indicated herein]
  a) Description [an explanation of the measurement operation]
  b) Collection Method [the form in which the measurement data is obtained, e.g., CC (Cumulative Counter)]
  c) Condition [The condition which causes the measurement result data to be updated, which can be defined by identifying protocol related trigger events for starting and stopping measurement processes, or updating the current measurement result value, as either a precise condition or conditional circumstances]
  d) Measurement Result (measured value(s), Units) [a description of expected result value(s) (e.g., a single integer value)].
  e) Measurement Type [a short form of the measurement name specified in the header, which is used to identify the measurement type in the result files; a dotted sequences of items organised from the general to the particular: (1) The first item identifies the measurement family; (2) The second item identifies the name of the measurement itself; and (3) Additional items may be present to specify subcounters]
  f) Measurement Object Class [a description of the measured object class (e.g., SMFFunction (SMF Function))]
  g) Switching Technology [the Switching domain(s) the measurement is applicable to, e.g., Circuit Switched and/or Packet Switched]
  h) Generation [whether the measurement type relates to GSM, UMTS, EPS, 5GS (5G System), combined (GSM+UMTS+EPS+5GS), or IMS]
  i) Purpose [an optional clause aimed at describing who will be using the measurement, such as by indicating one or more targeted categories of users]

A.X Monitoring of N4 Session Management

The following discussion is one example scenario wherein techniques and performance measurements discussed herein can be employed.

As discussed above, the UPF (e.g., via system $100_{UPF}$) handles the user plane path of PDU Sessions. UPF selection is performed by SMF (e.g., via system $100_{SMF}$), and deployments where a UPF is controlled either by a single SMF or multiple SMFs (for different PDU Sessions) are supported.

The SMF uses N4 session management procedures to control the traffic detection, traffic reporting, QoS enforcement and traffic routing of the UPF.

The N4 session management procedures comprise a N4 Session Establishment procedure, a N4 session Modification procedure and a N4 session release procedure.

If the UPF fails to handle the user plane path for a PDU session, the user service will be impacted. Thus, various embodiments can facilitate monitoring of the performance of N4 session management via one or more performance measurements discussed herein.

5.1.1.x PDU Session Modifications 5.1.1.x.1 Number of Requested PDU Session Modifications (UE Initiated)
- a) This measurement provides the number of PDU session modification requests (initiated by UE) received by the SMF.
- b) CC
- c) On receipt of Nsmf_PDUSession_UpdateSMContext Request which includes the N1 SM [Session Management] container IE [Information Element] indicating the "PDU Session Modification Request" (see 3GPP TS 23.502) by the SMF from AMF.
- d) A single integer value
- e) SM.PduSessionModUeInitReq
- f) SMFFunction
- g) Valid for packet switched traffic
- h) 5GS 5.1.1.x.2 Number of Successful PDU Session Modifications (UE Initiated)
- a) This measurement provides the number of successful PDU session modifications (initiated by UE) acknowledged by the SMF.
- b) CC
- c) On transmission of Nsmf_PDUSession_UpdateSMContext Response indicating a successful PDU session modification by the SMF to AMF as reply to a smf_PDUSession_UpdateSMContext Request that includes the N1 SM container IE indicating the "PDU Session Modification Complete" (see 3GPP TS 23.502) for a PDU session modification request (initiated by the UE).
- d) A single integer value
- e) SM.PduSessionModUeInitSucc
- f) SMFFunction
- g) Valid for packet switched traffic
- h) 5GS 5.1.1.x.3 Number of Failed PDU Session Modifications (UE Initiated)
- a) This measurement provides the number of failed PDU session modifications (initiated by UE) responded by the SMF. This measurement is split into subcounters per failure cause.
- b) CC
- c) On transmission of Nsmf_PDUSession_UpdateSMContext Response indicating a failed PDU session modification by the SMF to AMF (see TS 23.502) for a PDU session modification request (initiated by the UE). Each transmitted Nsmf_PDUSession_UpdateSMContext Response indicating the failed PDU session modification triggers the relevant subcounter per failure cause (see the causes listed in table 6.1.3.3.4.2.2-2 of TS 29.502) to increment by 1.
- d) A single integer value
- e) SM.PduSessionModUeInitFail.Cause
  Where Cause identifies the cause of the PDU session modification failure. Encoding of the Cause is defined in table 6.1.3.3.4.2.2-2 of TS 29.502.
- f) SMFFunction
- g) Valid for packet switched traffic
- h) 5GS 5.1.1.x.4 Number of Requested PDU Session Modifications (SMF Initiated)
- a) This measurement provides the number of PDU session modification requests (initiated by SMF) sent by the SMF to AMF.
- b) CC
- c) On transmission of Namf_Communication_N1N2MessageTransfer which includes the N2 SM information IE and N1 SM container IE indicating the "PDU Session Modification Command" (see 3GPP TS 23.502) by the SMF to AMF.
- d) A single integer value
- e) SM.PduSessionModSmfInitReq.
- f) SMFFunction
- g) Valid for packet switched traffic
- h) 5GS 5.1.1.x.5 Number of Successful PDU Session Modifications (SMF Initiated)
- a) This measurement provides the number of successful PDU session modifications (initiated by SMF) acknowledged by the SMF.
- b) CC
- c) On transmission of Nsmf_PDUSession_UpdateSMContext Response indicating a successful PDU session modification by the SMF to AMF as reply to a smf_PDUSession_UpdateSMContext Request that includes the N1 SM container IE indicating the "PDU Session Modification Complete" (see 3GPP TS 23.502) for a PDU session modification request (initiated by the SMF).
- d) A single integer value
- e) SM.PduSessionModSmfInitSucc
- f) SMFFunction
- g) Valid for packet switched traffic
- h) 5GS 5.1.1.x.6 Number of Failed PDU Session Modifications (SMF Initiated)
- a) This measurement provides the number of failed PDU session modifications (initiated by SMF) responded by the SMF. This measurement is split into subcounters per failure cause.
- b) CC
- c) On transmission of Nsmf_PDUSession_UpdateSMContext Response indicating a failed PDU session modification by the SMF to AMF (see TS 23.502) for a PDU session modification request (initiated by the SMF). Each transmitted Nsmf_PDUSession_UpdateSMContext Response indicating the failed PDU session modification triggers the relevant subcounter per failure cause (see the causes listed in table 6.1.3.3.4.2.2-2 of TS 29.502) to increment by 1.
- d) A single integer value
- e) SM.PduSessionModSmfInitFail.Cause
  Where Cause identifies the cause of the PDU session modification failure. Encoding of the Cause is defined in in table 6.1.3.3.4.2.2-2 of TS 29.502.
- f) SMFFunction
- g) Valid for packet switched traffic
- h) 5GS 5.1.1.x.7 Number of QoS Flows Requested to Add in the PDU Session Modifications (UE Initiated)
- a) This measurement provides the number of QoS flows requested to add in the PDU session modification requests (initiated by the UE) received by the SMF. This measurement is split into subcounters per S-NSSAI [Single Network Slice Selection Assistance Information] and subcounters per 5QI [5G QoS Indicator].
- b) CC
- c) On receipt of Nsmf_PDUSession_UpdateSMContext Request which includes the N1 SM container IE indicating the "PDU Session Modification Request" that contains the QoS flows requested to add (see 3GPP TS 23.502) by the SMF from AMF. Each QoS flow requested to add in this message triggers the relevant subcounter per S-NSSAI and the relevant subcounter per 5QI to increment by 1 respectively (the S-NSSAI is the S-NSSAI that the PDU session belongs to, or the new S-NSSAI if the S-NSSAI for the serving PLMN [Public Land Mobile Network] derived from the S-NSSAI of the home PLMN differs from the S-NSSAI provided in the Create SM Context Request, see section of 6.1.6.2.4 in TS 29.502).
- d) Each measurement is an integer value
- e) SM.NbrQfAddPduSessionModUeInitReq.SNSSAI and SM.NbrQfAddPduSessionModUeInitReq.5QI
  Where the SNSSAI identifies the S-NSSAI, and the 5QI identifies the 5QI.
- f) SMFFunction
- g) Valid for packet switched traffic
- h) 5GS
- i) One usage of this measurement is for performance assurance.

5.1.1.x.8 Number of QoS Flows Successfully Added in the PDU Session Modifications (UE Initiated)
- a) This measurement provides the number of QoS flows successfully added in the PDU session modifications (initiated by the UE) acknowledged by the SMF. This measurement is split into subcounters per S-NSSAI and subcounters per 5QI.
- b) CC
- c) On transmission of Nsmf_PDUSession_UpdateSMContext Response indicating a successful PDU session modification by the SMF to AMF, as reply to a received smf_PDUSession_UpdateSMContext Request (A) that includes the N1 SM container IE indicating the "PDU Session Modification Complete" (see 3GPP TS 23.502, and TS 29.502) for a PDU session modification request (initiated by the UE). And, for this PDU session modification request, the smf_PDUSession_UpdateSMContext Request (B) containing the N2 SM information IE that indicates the "PDU Session Resource Modify Response Transfer" and contains the added QoS flows has been received by the SMF from AMF (see 3GPP TS 23.502, and TS 29.502). Each added QoS flow in the Nsmf_PDUSession_UpdateSMContext Response (B) triggers the relevant subcounter per S-NSSAI and the relevant subcounter per 5QI to increment by 1 respectively (the S-NSSAI is the S-NSSAI that the PDU session belongs to, or the new S-NSSAI if the S-NSSAI for the serving PLMN derived from the S-NSSAI of the home PLMN differs from the S-NSSAI provided in the Create SM Context Request, see section of 6.1.6.2.4 in TS 29.502).
- d) Each measurement is an integer value
- e) SM.NbrQfAddPduSessionModUeInitSucc.SNSSAI and SM.NbrQfAddPduSessionModUeInitSucc.5QI
  Where the SNSSAI identifies the S-NSSAI, and the 5QI identifies the 5QI.
- f) SMFFunction
- g) Valid for packet switched traffic
- h) 5GS
- i) One usage of this measurement is for performance assurance.

5.1.1.x.9 Number of QoS Flows Requested to Add in the PDU Session Modifications (SMF Initiated)
- a) This measurement provides the number of QoS flows requested to add in the PDU session modification requests (initiated by the SMF) sent by the SMF. This measurement is split into subcounters per S-NSSAI and subcounters per 5QI.
- b) CC
- c) On transmission of Namf_Communication_N1N2MessageTransfer which includes the N2 SM information IE and N1 SM container IE indicating the "PDU Session Modification Command" that contains the QoS flows requested to add by the SMF to AMF (see 3GPP TS 23.502). Each QoS flow requested to add in this message triggers the relevant subcounter per S-NSSAI and the relevant subcounter per 501 to increment by 1 respectively (the S-NSSAI is the S-NSSAI that the PDU session belongs to, or the new S-NSSAI if the S-NSSAI for the serving PLMN derived from the S-NSSAI of the home PLMN differs from the S-NSSAI provided in the Create SM Context Request, see section of 6.1.6.2.4 in TS 29.502).
- d) Each measurement is an integer value
- e) SM.NbrQfAddPduSessionModSmfInitReq.SNSSAI and SM.NbrQfAddPduSessionModSmfInitReq.5QI
  Where the SNSSAI identifies the S-NSSAI, and the 5QI identifies the 5QI.
- f) SMFFunction
- g) Valid for packet switched traffic
- h) 5GS
- i) One usage of this measurement is for performance assurance.

5.1.1.x.10 Number of QoS Flows Successfully Added in the PDU Session Modifications (SMF Initiated)
- a) This Measurement Provides the Number of QoS Flows Successfully Added in the PDU Session Modifications (Initiated by the SMF) Acknowledged by the SMF.
  This measurement is split into subcounters per S-NSSAI and subcounters per 5QI.
- b) CC
- c) On transmission of Nsmf_PDUSession_UpdateSMContext Response indicating a successful PDU session modification by the SMF to AMF, as reply to a received smf_PDUSession_UpdateSMContext Request that includes the N1 SM container IE indicating the "PDU Session Modification Complete" (see 3GPP TS 23.502, and TS 29.502) for a PDU session modification request (initiated by the SMF). And, for this PDU session modification request, the smf_PDUSession_UpdateSMContext Request (B) containing the N2 SM information IE that indicates the "PDU Session Resource Modify Response Transfer" and contains the added QoS flows has been received by the SMF from AMF (see 3GPP TS 23.502, and TS 29.502). Each added QoS flow in the Nsmf_PDUSession_UpdateSMContext Response (B) triggers the relevant subcounter per S-NSSAI and the relevant subcounter per 501 to increment by 1 respectively (the S-NSSAI is the S-NSSAI that the PDU session belongs to, or the new S-NSSAI if the S-NSSAI for the serving PLMN derived from the S-NSSAI of the home PLMN differs from the S-NSSAI provided in the Create SM Context Request, see section of 6.1.6.2.4 in TS 29.502).
d) Each measurement is an integer value
e) SM.NbrQfAddPduSessionModSmfInitSucc.SNSSAI and SM.NbrQfAddPduSessionModSmfInitSucc.5QI Where the SNSSAI identifies the S-NSSAI, and the 5QI identifies the 5QI.
f) SMFFunction
g) Valid for packet switched traffic
h) 5GS
i) One usage of this measurement is for performance assurance.

5.1.1.x.11 Number of QoS Flows Requested to Modify in the PDU Session Modifications (UE Initiated)
a) This measurement provides the number of QoS flows requested to modify in the PDU session modification requests (initiated by the UE) received by the SMF. This measurement is split into subcounters per S-NSSAI and subcounters per 5QI.
b) CC
c) On receipt of Nsmf_PDUSession_UpdateSMContext Request which includes the N1 SM container IE indicating the "PDU Session Modification Request" that contains the QoS flows requested to modify (see 3GPP TS 23.502) by the SMF from AMF. Each QoS flow requested to modify in this message triggers the relevant subcounter per S-NSSAI and the relevant subcounter per 501 to increment by 1 respectively (the S-NSSAI is the S-NSSAI that the PDU session belongs to, or the new S-NSSAI if the S-NSSAI for the serving PLMN derived from the S-NSSAI of the home PLMN differs from the S-NSSAI provided in the Create SM Context Request, see section of 6.1.6.2.4 in TS 29.502).
d) Each measurement is an integer value
e) SM.NbrQfModPduSessionModUeInitReq.SNSSAI and SM.NbrQfModPduSessionModUeInitReq.5QI Where the SNSSAI identifies the S-NSSAI, and the 5QI identifies the 5QI.
f) SMFFunction
g) Valid for packet switched traffic
h) 5GS
i) One usage of this measurement is for performance assurance.

5.1.1.x.12 Number of QoS Flows Successfully Modified in the PDU Session Modifications (UE Initiated)
a) This measurement provides the number of QoS flows successfully modified in the PDU session modifications (initiated by the UE) acknowledged by the SMF. This measurement is split into subcounters per S-NSSAI and subcounters per 5QI.
b) CC
c) On transmission of Nsmf_PDUSession_UpdateSMContext Response indicating a successful PDU session modification by the SMF to AMF, as reply to a received smf_PDUSession_UpdateSMContext Request (A) that includes the N1 SM container IE indicating the "PDU Session Modification Complete" (see 3GPP TS 23.502, and TS 29.502) for a PDU session modification request (initiated by the UE). And, for this PDU session modification request, the smf_PDUSession_UpdateSMContext Request (B) containing the N2 SM information IE that indicates the "PDU Session Resource Modify Response Transfer" and contains the modified QoS flows has been received by the SMF from AMF (see 3GPP TS 23.502, and TS 29.502). Each modified QoS flow in the Nsmf_PDUSession_UpdateSMContext Response (B) triggers the relevant subcounter per S-NSSAI and the relevant subcounter per 5QI to increment by 1 respectively (the S-NSSAI is the S-NSSAI that the PDU session belongs to, or the new S-NSSAI if the S-NSSAI for the serving PLMN derived from the S-NSSAI of the home PLMN differs from the S-NSSAI provided in the Create SM Context Request, see section of 6.1.6.2.4 in TS 29.502).
d) Each measurement is an integer value
e) SM.NbrQfModPduSessionModUeInitSucc.SNSSAI and SM.NbrQfModPduSessionModUeInitSucc.5QI Where the SNSSAI identifies the S-NSSAI, and the 5QI identifies the 5QI.
f) SMFFunction
g) Valid for packet switched traffic
h) 5GS
i) One usage of this measurement is for performance assurance.

5.1.1.x.13 Number of QoS Flows Requested to Modify in the PDU Session Modifications (SMF Initiated)
a) This measurement provides the number of QoS flows requested to modify in the PDU session modification requests (initiated by the SMF) sent by the SMF. This measurement is split into subcounters per S-NSSAI and subcounters per 5QI.
b) CC
c) On transmission of Namf_Communication_N1N2MessageTransfer which includes the N2 SM information IE and N1 SM container IE indicating the "PDU Session Modification Command" that contains the QoS flows requested to modify by the SMF to AMF (see 3GPP TS 23.502). Each QoS flow requested to modify in this message triggers the relevant subcounter per S-NSSAI and the relevant subcounter per 501 to increment by 1 respectively (the S-NSSAI is the S-NSSAI that the PDU session belongs to, or the new S-NSSAI if the S-NSSAI for the serving PLMN derived from the S-NSSAI of the home PLMN differs from the S-NSSAI provided in the Create SM Context Request, see section of 6.1.6.2.4 in TS 29.502).
d) Each measurement is an integer value
e) SM.NbrQfModPduSessionModSmfInitReq.SNSSAI and SM.NbrQfModPduSessionModSmfInitReq.5QI Where the SNSSAI identifies the S-NSSAI, and the 5QI identifies the 5QI.
f) SMFFunction
g) Valid for packet switched traffic
h) 5GS
i) One usage of this measurement is for performance assurance.

5.1.1.x.14 Number of QoS Flows Successfully Modified in the PDU Session Modifications (SMF Initiated)
a) This measurement provides the number of QoS flows successfully modified in the PDU session modifications (initiated by the SMF) acknowledged by the SMF. This measurement is split into subcounters per S-NSSAI and subcounters per 5QI.
b) CC
c) On transmission of Nsmf_PDUSession_UpdateSMContext Response indicating a successful PDU session modification by the SMF to AMF, as reply to a received smf_PDUSession_UpdateSMContext Request that includes the N1 SM container IE indicating the "PDU Session Modification Complete" (see 3GPP TS 23.502, and TS 29.502) for a PDU session modification request (initiated by the SMF). And, for this PDU session modification request, the smf_PDUSession_UpdateSMContext Request (B) containing the N2 SM information IE that indicates the "PDU Session Resource Modify Response Transfer" and contains the modified QoS flows has been received by the SMF from AMF (see 3GPP TS 23.502, and TS 29.502). Each modified QoS flow in the Nsmf_PDUSession_UpdateSMContext Response (B) triggers the relevant subcounter per S-NSSAI and the relevant subcounter per 5QI to increment by 1 respectively (the S-NSSAI is the S-NSSAI that the PDU session belongs to, or the new S-NSSAI if the S-NSSAI for the serving PLMN derived from the S-NSSAI of the home PLMN differs from the S-NSSAI provided in the Create SM Context Request, see section of 6.1.6.2.4 in TS 29.502).
   d) Each measurement is an integer value
   e) SM.NbrQfModPduSessionModSmfInitSucc.SNSSAI and SM.NbrQfModPduSessionModSmfInitSucc.5QI
      Where the SNSSAI identifies the S-NSSAI, and the 5QI identifies the 5QI.
   f) SMFFunction
   g) Valid for packet switched traffic
   h) 5GS
   i) One usage of this measurement is for performance assurance.

A.Y Monitoring of PDU Session Releases

The PDU session can be released by the UE (e.g., via system $100_{UE}$), SMF (e.g., via system $100_{SMF}$), or AMF (e.g., via system $100_{AMF}$). When a PDU session is released for an unexpected reason, the user service can be impacted. The PDU session releases initiated by the UE and SMF are usually triggered by normal reason (e.g., UE deregistration, under request from DN, etc.). The PDU session releases initiated by AMF may be due to an abnormal reason (e.g., mismatch of PDU Session status between UE and AMF). Thus, various embodiments can facilitate monitoring of PDU session releases initiated by AMF.

5.1.1.y PDU Session Modifications
5.1.1.y.1 Number of Released PDU Sessions (AMF Initiated)
   a) This measurement provides the number of released PDU sessions (initiated by AMF) at the SMF. This measurement is split into subcounters per S-NSSAI and subcounters per cause.
   b) CC
   c) On transmission of Nsmf_PDUSession_ReleaseSMContext Response indicating a successful PDU session release from the SMF to AMF, as a reply to the received Nsmf_PDUSession_ReleaseSMContext Request from the AMF (see 3GPP TS 23.502). Each transmitted Nsmf_PDUSession_ReleaseSMContext Response triggers the relevant subcounter per S-NSSAI and the relevant subcounter per cause (the cause, ngApCause or 5GMmCauseValue as indicated in the received Nsmf_PDUSession_ReleaseSMContext Request, see Table 6.1.6.2.6-1 of TS 29.502) to increment by 1 respectively.
   d) A single integer value
   e) SM.PduSessionRelAmfInit.SNSSAI and SM.PduSessionRelAmfInit.cause
   Where the SNSSAI identifies the S-NSSAI; and the cause identifies the cause, ngApCause or 5GMmCauseValue as indicated in the received Nsmf_PDUSession_ReleaseSMContext Request, see Table 6.1.6.2.6-1 of TS 29.502).
   f) SMFFunction
   g) Valid for packet switched traffic
   h) 5GS
   i) One usage of this measurement is for performance assurance.

A.Z Monitoring of N4 Session Management

As discussed above, the UPF (e.g., via system $100_{UPF}$) handles the user plane path of PDU Sessions. UPF selection is performed by SMF (e.g., via system $100_{SMF}$), and deployments where a UPF is controlled either by a single SMF or multiple SMFs (for different PDU Sessions) are supported.

The SMF uses N4 session management procedures to control the traffic detection, traffic reporting, QoS enforcement and traffic routing of the UPF.

The N4 session management procedures comprise a N4 Session Establishment procedure, a N4 session Modification procedure and a N4 session release procedure.

If the UPF fails to handle the user plane path for a PDU session, the user service will be impacted. Thus, various embodiments can facilitate monitoring of the performance of N4 session management via one or more performance measurements discussed herein.

5.4.x N4 Interface Related Measurements
5.4.x.1 Session Establishments
5.4.x.1.1 Number of Requested N4 Session Establishments
   a) This measurement provides the number of N4 session establishment requests received by the UPF.
   b) CC
   c) On receipt of N4 session establishment request message (see 3GPP TS 23.502) by the UPF from SMF.
   d) A single integer value
   e) SM.N4SessionEstabReq
   f) UPFFunction
   g) Valid for packet switched traffic
   h) 5GS
5.4.x.1.2 Number of Failed N4 Session Establishments
   a) This measurement provides the number of failed N4 session establishments at the UPF. This measurement is split into subcounters per rejection cause.
   b) CC
   c) On transmission of N4 session establishment response message that contains the cause indicating the rejection of N4 session establishment request (see 3GPP TS 23.502) by the UPF to SMF. Each N4 session establishment response message indicating the rejection of N4 session establishment request triggers the relevant subcounter per rejection cause to increment by 1.
   d) A single integer value
   e) SM.N4SessionEstabFail.cause
      where the cause identities the cause of the rejection of N4 session establishment request, per the encoding of the cause defined in section 8.2.1 of TS 29.224.
   f) UPFFunction
   g) Valid for packet switched traffic
   h) 5GS Additional Embodiments Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

A first example embodiment is a service producer supported by one or more processors, configured to: obtain the raw performance measurements from SMF(s); and generate the performance measurements for SMF(s) based on the raw performance measurements.

A second example embodiment is based on the first example embodiment, wherein the service producer is located in a SMF or a management function.

A third example embodiment is based on the first or the second example embodiment, wherein the performance measurement is related to PDU session modification.

A fourth example embodiment is based on the first or the second example embodiment, wherein the performance measurement is related to PDU session release.

A fifth example embodiment is based on the third example embodiment, wherein the performance measurement is one of a number of requested PDU session modifications, number of successful PDU session modifications, number of failed PDU session modifications, number of QoS flows requested to add in the PDU session modifications, number of QoS flows successfully added in the PDU session modifications, number of QoS flows requested to modify in the PDU session modifications, or number of QoS flows successfully modified in the PDU session modifications.

A sixth example embodiment is based on the fifth example embodiment, wherein the performance measurements are for the PDU session modifications initiated by UE, or for the PDU session modifications initiated by SMF, or for all kinds of PDU session modifications.

A seventh example embodiment is based on the fifth or sixth example embodiment, wherein the performance measurement of number of requested PDU session modifications (initiated by UE) is a cumulative counter (CC) which is incremented by 1 on receipt of Nsmf_PDUSession_UpdateSMContext Request which includes the N1 SM container IE indicating the "PDU Session Modification Request" (see 3GPP TS 23.502) by the SMF from AMF; the performance measurement of number of successful PDU session modifications (UE initiated) is a cumulative counter (CC) which is incremented by 1 on transmission of Nsmf_PDUSession_UpdateSMContext Response indicating a successful PDU session modification by the SMF to AMF as reply to a smf_PDUSession_UpdateSMContext Request that includes the N1 SM container IE indicating the "PDU Session Modification Complete" (see 3GPP TS 23.502) for a PDU session modification request (initiated by the UE); the performance measurement of number of failed PDU session modifications (UE initiated) is a cumulative counter (CC) which is incremented by 1 on transmission of Nsmf_PDUSession_UpdateSMContext Response indicating a failed PDU session modification by the SMF to AMF (see TS 23.502) for a PDU session modification request (initiated by the UE), and the increment is made to the relevant subcounter per failure cause (see the causes listed in table 6.1.3.3.4.2.2-2 of TS 29.502); the performance measurement of number of requested PDU session modifications (SMF initiated) is a cumulative counter (CC) which is incremented by 1 on transmission of Namf_Communication_N1N2MessageTransfer which includes the N2 SM information IE and N1 SM container IE indicating the "PDU Session Modification Command" (see 3GPP TS 23.502 [7]) by the SMF to AMF; the performance measurement of number of successful PDU session modifications (SMF initiated) is a cumulative counter (CC) which is incremented by 1 on transmission of Nsmf_PDUSession_UpdateSMContext Response indicating a successful PDU session modification by the SMF to AMF as reply to a smf_PDUSession_UpdateSMContext Request that includes the N1 SM container IE indicating the "PDU Session Modification Complete" (see 3GPP TS 23.502) for a PDU session modification request (initiated by the SMF); the performance measurement of number of failed PDU session modifications (SMF initiated) is a cumulative counter (CC) which is incremented by 1 on transmission of Nsmf_PDUSession_UpdateSMContext Response indicating a failed PDU session modification by the SMF to AMF (see TS 23.502) for a PDU session modification request (initiated by the SMF), and the increment is made to the relevant subcounter per failure cause (see the causes listed in table 6.1.3.3.4.2.2-2 of TS 29.502); the performance measurement of number of QoS flows requested to add in the PDU session modifications (UE initiated) is a cumulative counter (CC) which is incremented by 1 on receipt of Nsmf_PDUSession_UpdateSMContext Request which includes the N1 SM container IE indicating the "PDU Session Modification Request" that contains the QoS flows requested to add (see 3GPP TS 23.502) by the SMF from AMF, and the increment is made to the relevant subcounter per S-NSSAI and/or the relevant subcounter per 5QI respectively (the S-NSSAI is the S-NSSAI that the PDU session belongs to, or the new S-NSSAI if the S-NSSAI for the serving PLMN derived from the S-NSSAI of the home PLMN differs from the S-NSSAI provided in the Create SM Context Request, see section of 6.1.6.2.4 in TS 29.502); the performance measurement of number of QoS flows successfully added in the PDU session modifications (UE initiated) is a cumulative counter (CC) which is incremented by 1 on transmission of Nsmf_PDUSession_UpdateSMContext Response indicating a successful PDU session modification by the SMF to AMF, as reply to a received smf_PDUSession_UpdateSMContext Request (A) that includes the N1 SM container IE indicating the "PDU Session Modification Complete" (see 3GPP TS 23.502, and TS 29.502) for a PDU session modification request (initiated by the UE), and, for this PDU session modification request, the smf_PDUSession_UpdateSMContext Request (B) containing the N2 SM information IE that indicates the "PDU Session Resource Modify Response Transfer" and contains the added QoS flows has been received by the SMF from AMF (see 3GPP TS 23.502, and TS 29.502), and the increment is made to the relevant subcounter per S-NSSAI and/or the relevant subcounter per 5QI respectively (the S-NSSAI is the S-NSSAI that the PDU session belongs to, or the new S-NSSAI if the S-NSSAI for the serving PLMN derived from the S-NSSAI of the home PLMN differs from the S-NSSAI provided in the Create SM Context Request, see section of 6.1.6.2.4 in TS 29.502); the performance measurement of number of QoS flows requested to add in the PDU session modifications (SMF initiated) is a cumulative counter (CC) which is incremented by 1 On transmission of Namf_Communication_N1N2MessageTransfer which includes the N2 SM information IE and N1 SM container IE indicating the "PDU Session Modification Command" that contains the QoS flows requested to add by the SMF to AMF (see 3GPP TS 23.502), and the increment is made to the relevant subcounter per S-NSSAI and/or the relevant subcounter per 5QI respectively (the S-NSSAI is the S-NSSAI that the PDU session belongs to, or the new S-NSSAI if the S-NSSAI for the serving PLMN derived from the S-NSSAI of the home PLMN differs from the S-NSSAI provided in the Create SM Context Request, see section of 6.1.6.2.4 in TS 29.502); the performance measurement of number of QoS flows successfully added in the PDU session modifications (SMF initiated) is a cumulative counter (CC) which is incremented by 1 on transmission of Nsmf_PDUSession_UpdateSMContext Response indicating a successful PDU session modification by the SMF to AMF, as reply to a received smf_PDUSession_UpdateSMContext Request that includes the N1 SM container IE indicating the "PDU Session Modification Complete" (see 3GPP TS 23.502, and TS 29.502) for a PDU session modification request (initiated by the SMF), and, for this PDU session modification request, the smf_PDUSession_UpdateSMContext Request (B) containing the N2 SM information IE that indicates the "PDU Session Resource Modify Response Transfer" and contains the added QoS flows has been received by the SMF from AMF (see 3GPP TS 23.502, and TS 29.502), and the increment is made to the relevant subcounter per S-NSSAI and/or the relevant subcounter per 501 respectively (the S-NSSAI is the S-NSSAI that the PDU session belongs to, or the new S-NSSAI if the S-NSSAI for the serving PLMN derived from the S-NSSAI of the home PLMN differs from the S-NSSAI provided in the Create SM Context Request, see section of 6.1.6.2.4 in TS 29.502); the performance measurement of number of QoS flows requested to modify in the PDU session modifications (UE initiated) is a cumulative counter (CC) which is incremented by 1 on receipt of Nsmf_PDUSession_UpdateSMContext Request which includes the N1 SM container IE indicating the "PDU Session Modification Request" that contains the QoS flows requested to modify (see 3GPP TS 23.502) by the SMF from AMF, and the increment is made to the relevant subcounter per S-NSSAI and/or the relevant subcounter per 501 respectively (the S-NSSAI is the S-NSSAI that the PDU session belongs to, or the new S-NSSAI if the S-NSSAI for the serving PLMN derived from the S-NSSAI of the home PLMN differs from the S-NSSAI provided in the Create SM Context Request, see section of 6.1.6.2.4 in TS 29.502); the performance measurement of number of QoS flows successfully modified in the PDU session modifications (UE initiated) is a cumulative counter (CC) which is incremented by 1 on transmission of Nsmf_PDUSession_UpdateSMContext Response indicating a successful PDU session modification by the SMF to AMF, as reply to a received smf_PDUSession_UpdateSMContext Request (A) that includes the N1 SM container IE indicating the "PDU Session Modification Complete" (see 3GPP TS 23.502, and TS 29.502) for a PDU session modification request (initiated by the UE), and, for this PDU session modification request, the smf_PDUSession_UpdateSMContext Request (B) containing the N2 SM information IE that indicates the "PDU Session Resource Modify Response Transfer" and contains the modified QoS flows has been received by the SMF from AMF (see 3GPP TS 23.502, and TS 29.502), and the increment is made to the relevant subcounter per S-NSSAI and/or the relevant subcounter per 501 respectively (the S-NSSAI is the S-NSSAI that the PDU session belongs to, or the new S-NSSAI if the S-NSSAI for the serving PLMN derived from the S-NSSAI of the home PLMN differs from the S-NSSAI provided in the Create SM Context Request, see section of 6.1.6.2.4 in TS 29.502); the performance measurement of number of QoS flows requested to modify in the PDU session modifications (SMF initiated) is a cumulative counter (CC) which is incremented by 1 on transmission of Namf_Communication_N1N2MessageTransfer which includes the N2 SM information IE and N1 SM container IE indicating the "PDU Session Modification Command" that contains the QoS flows requested to modify by the SMF to AMF (see 3GPP TS 23.502), and the increment is made to the relevant subcounter per S-NSSAI and/or the relevant subcounter per 501 respectively (the S-NSSAI is the S-NSSAI that the PDU session belongs to, or the new S-NSSAI if the S-NSSAI for the serving PLMN derived from the S-NSSAI of the home PLMN differs from the S-NSSAI provided in the Create SM Context Request, see section of 6.1.6.2.4 in TS 29.502); the performance measurement of number of QoS flows successfully modified in the PDU session modifications (SMF initiated) is a cumulative counter (CC) which is incremented by 1 on transmission of Nsmf_PDUSession_UpdateSMContext Response indicating a successful PDU session modification by the SMF to AMF, as reply to a received smf_PDUSession_UpdateSMContext Request that includes the N1 SM container IE indicating the "PDU Session Modification Complete" (see 3GPP TS 23.502, and TS 29.502) for a PDU session modification request (initiated by the SMF), and, for this PDU session modification request, the smf_PDUSession_UpdateSMContext Request (B) containing the N2 SM information IE that indicates the "PDU Session Resource Modify Response Transfer" and contains the modified QoS flows has been received by the SMF from AMF (see 3GPP TS 23.502, and TS 29.502), and the increment is made to the relevant subcounter per S-NSSAI and/or the relevant subcounter per 501 respectively (the S-NSSAI is the S-NSSAI that the PDU session belongs to, or the new S-NSSAI if the S-NSSAI for the serving PLMN derived from the S-NSSAI of the home PLMN differs from the S-NSSAI provided in the Create SM Context Request, see section of 6.1.6.2.4 in TS 29.502).

An eighth example embodiment is based on the fourth example embodiment, wherein the performance measurement is the number of released PDU sessions.

A ninth example embodiment is based on the fourth or eighth example embodiment, wherein the PDU session releases are initiated by AMF.

A tenth example embodiment is based on the eighth and ninth example embodiment, wherein the performance measurement of number of released PDU sessions (AMF initiated) is a cumulative counter (CC) which is incremented by 1 on transmission of Nsmf_PDUSession_ReleaseSMContext Response indicating a successful PDU session release from the SMF to AMF, as a reply to the received Nsmf_PDUSession_ReleaseSMContext Request from the AMF (see 3GPP TS 23.502). And the increment is made to the relevant subcounter per cause (the cause, ngApCause or 5GMmCauseValue as indicated in the received Nsmf_PDUSession_ReleaseSMContext Request, see Table 6.1.6.2.6-1 of TS 29.502).

An eleventh example embodiment is a service producer supported by one or more processors, is configured to: obtain the raw performance measurements from UPF(s); and generate the performance measurements for UPF(s) based on the raw performance measurements.

A twelfth example embodiment is based on the eleventh example embodiment, wherein the service producer is located in a UPF or a management function.

A thirteenth example embodiment is based on the eleventh or twelfth example embodiment, wherein the performance measurement is related to N4 session establishment.

A fourteenth example embodiment is based on the thirteenth example embodiment, wherein the performance measurement is number of requested N4 session establishments or number of failed N4 session establishments.

A fifteenth example embodiment is based on the fourteenth example embodiment, wherein: the performance measurement of number of requested N4 session establishments is a cumulative counter (CC) which is incremented by 1 on receipt of N4 session establishment request message (see 3GPP TS 23.502) by the UPF from SMF; the performance measurement of number of number of PDU Sessions successfully setup is a cumulative counter (CC) which is incremented by 1 for each PDU session contained in the "PDU Session Resource Setup Response List" IE when transmitting the PDU SESSION RESOURCE SETUP RESPONSE message by the gNB to the AMF; the performance measurement of number of failed N4 session establishments is a cumulative counter (CC) which is increased by 1 on transmission of N4 session establishment response message that contains the cause indicating the rejection of N4 session establishment request (see 3GPP TS 23.502) by the UPF to SMF, and the increment is made to the relevant subcounter per rejection cause, where the encoding of the cause is defined in section 8.2.1 of TS 29.224.

The following are additional example embodiments.

Example 1 is an apparatus configured to be employed in a service provider for a component of a Fifth Generation Core Network (5GC), comprising: a memory interface; and processing circuitry configured to: obtain one or more raw performance measurements from the component of the 5GC; and generate one or more performance measurements for the component of the 5GC based on the one or more raw performance measurements, wherein the one or more raw performance measurements and the one or more performance measurements are associated with one or more of a PDU (Protocol Data Unit) session or a N4 session.

Example 2 comprises the subject matter of any variation of any of example(s) 1, wherein the component of the 5GC is one of a SMF (Session Management Function) or a UPF (User Plane Function).

Example 3 comprises the subject matter of any variation of any of example(s) 1, wherein the service producer is employed by one of a UPF (User Plane Function), a SMF (Session Management Function), or another management function.

Example 4 comprises the subject matter of any variation of any of example(s) 1-3, wherein the one or more raw performance measurements and the one or more performance measurements are associated with a PDU session modification.

Example 5 comprises the subject matter of any variation of any of example(s) 4, wherein the one or more performance measurements comprise at least one of a number of requested PDU session modifications that are UE (User Equipment) initiated, a number of successful PDU session modifications that are UE initiated, a number of failed PDU session modifications that are UE initiated, a number of requested PDU session modifications that are SMF (Session Management Function) initiated, a number of successful PDU session modifications that are SMF initiated, a number of failed PDU session modifications that are SMF initiated, a number of QoS (Quality of Service) flows requested to add in PDU session modifications that are UE initiated, a number of QoS flows successfully added in PDU session modifications that are UE initiated, a number of QoS flows requested to add in PDU session modifications that are SMF initiated, a number of QoS flows successfully added in PDU session modifications that are SMF initiated, a number of QoS flows requested to modify in PDU session modifications that are UE initiated, a number of QoS flows successfully modified in PDU session modifications that are UE initiated, a number of QoS flows requested to modify in PDU session modifications that are SMF initiated, or a number of QoS flows successfully modified in PDU session modifications that are SMF initiated.

Example 6 comprises the subject matter of any variation of any of example(s) 1-3, wherein the one or more raw performance measurements and the one or more performance measurements are associated with a PDU session release.

Example 7 comprises the subject matter of any variation of any of example(s) 6, wherein the one or more performance measurements comprise a number of released PDU sessions.

Example 8 comprises the subject matter of any variation of any of example(s) 7, wherein the number of released PDU sessions is a number of released PDU sessions that are AMF (Access Management Function) initiated.

Example 9 comprises the subject matter of any variation of any of example(s) 1-3, wherein the one or more raw performance measurements and the one or more performance measurements are associated with a N4 session establishment.

Example 10 comprises the subject matter of any variation of any of example(s) 8, wherein the one or more performance measurements comprise at least one of a number of requested N4 session establishments or a number of failed N4 session establishments.

Example 11 is an apparatus configured to be employed in a service provider for a Session Management Function (SMF), comprising: a memory interface; and processing circuitry configured to: obtain one or more raw performance measurements from the SMF; and generate one or more performance measurements for the SMF based on the one or more raw performance measurements, wherein the one or more raw performance measurements and the one or more performance measurements are associated with a PDU (Protocol Data Unit) session.

Example 12 comprises the subject matter of any variation of any of example(s) 11, wherein the service producer is employed by one of the SMF or another management function.

Example 13 comprises the subject matter of any variation of any of example(s) 11-12, wherein the one or more raw performance measurements and the one or more performance measurements are associated with a PDU session modification.

Example 14 comprises the subject matter of any variation of any of example(s) 13, wherein the one or more performance measurements comprise at least one of a number of requested PDU session modifications that are UE (User Equipment) initiated, a number of successful PDU session modifications that are UE initiated, a number of failed PDU session modifications that are UE initiated, a number of requested PDU session modifications that are SMF (Session Management Function) initiated, a number of successful PDU session modifications that are SMF initiated, a number of failed PDU session modifications that are SMF initiated, a number of QoS (Quality of Service) flows requested to add in PDU session modifications that are UE initiated, a number of QoS flows successfully added in PDU session modifications that are UE initiated, a number of QoS flows requested to add in PDU session modifications that are SMF initiated, a number of QoS flows successfully added in PDU session modifications that are SMF initiated, a number of QoS flows requested to modify in PDU session modifications that are UE initiated, a number of QoS flows successfully modified in PDU session modifications that are UE initiated, a number of QoS flows requested to modify in PDU session modifications that are SMF initiated, or a number of QoS flows successfully modified in PDU session modifications that are SMF initiated.

Example 15 comprises the subject matter of any variation of any of example(s) 11-12, wherein the one or more raw performance measurements and the one or more performance measurements are associated with a PDU session release.

Example 16 comprises the subject matter of any variation of any of example(s) 15, wherein the one or more performance measurements comprise a number of released PDU sessions.

Example 17 is an apparatus configured to be employed in a service provider for a User Plane Function (UPF), comprising: a memory interface; and processing circuitry configured to: obtain one or more raw performance measurements from the UPF; and generate one or more performance measurements for the UPF based on the one or more raw performance measurements, wherein the one or more raw performance measurements and the one or more performance measurements are associated with a N4 session.

Example 18 comprises the subject matter of any variation of any of example(s) 17, wherein the service producer is employed by one of the UPF or a management function.

Example 19 comprises the subject matter of any variation of any of example(s) 17-18, wherein the one or more raw performance measurements and the one or more performance measurements are associated with a N4 session establishment.

Example 20 comprises the subject matter of any variation of any of example(s) 19, wherein the one or more performance measurements comprise at least one of a number of requested N4 session establishments or a number of failed N4 session establishments.

Example 21 comprises an apparatus comprising means for executing any of the described operations of examples 1-20.

Example 22 comprises a machine readable medium that stores instructions for execution by a processor to perform any of the described operations of examples 1-20.

Example 23 comprises an apparatus comprising: a memory interface; and processing circuitry configured to: perform any of the described operations of examples 1-20.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature can be combined with one or more other features of the other implementations as may be desired and advantageous for any given or particular application.

What is claimed is:

1. An apparatus of a service producer for a Session Management Function (SMF), comprising:
   a memory interface; and
   processing circuitry configured to execute instructions accessed via the memory interface to cause the apparatus to:
   provide one or more counters, each counter associated with a category of Protocol Data Unit (PDU) session modification and a monitored message that is indicative of the category of PDU session modification;
   obtain one or more raw performance measurements from the SMF by monitoring messages communicated between the SMF and an Access Management Function (AMF) to detect occurrence of a monitored message;
   generate one or more performance measurements for the SMF by, in response to each occurrence of a monitored message, incrementing the counter associated with the monitored message,
   wherein respective ones of the one or more counters are indicative of a number of the PDU session modifications that are User Equipment (UE) initiated, a number of PDU session modifications that are SMF initiated, a number of Quality of Service (QOS) flows in the PDU session modifications that are UE initiated, or a number of QoS flows in the PDU session modifications that are SMF initiated; and
   provide the one or more performance measurements comprising values of the one or more counters to requesting entities.

2. The apparatus of claim 1, wherein the service producer is employed by one of the SMF or another management function.

3. The apparatus of claim 1, wherein the values of the one or more counters comprise at least one of
   an integer value for a number of requested PDU session modifications that are UE initiated,
   an integer value for a number of successful PDU session modifications that are UE initiated, or
   an integer value for a number of failed PDU session modifications that are UE initiated.

4. The apparatus of claim 1, wherein the values of the one or more counters comprise at least one of
   an integer value for a number of requested PDU session modifications that are SMF initiated,
   an integer value for a number of successful PDU session modifications that are SMF initiated, or
   an integer value for a number of failed PDU session modifications that are SMF initiated.

5. The apparatus of claim 1, wherein the values of the one or more counters comprise at least one of
   an integer value for a number of QoS flows requested to add in PDU session modifications that are UE initiated for each Single Network Slice Selection Assistance Information (S-NSSAI) and for each 5G QoS Indicator (5QI), or
   an integer value for a number of QoS flows successfully added in PDU session modifications that are UE initiated for each S-NSSAI and for each 5QI.

6. The apparatus of claim 1, wherein the values of the one or more counters comprise at least one of
   an integer value for a number of QoS flows requested to add in PDU session modifications that are SMF initiated for each Single Network Slice Selection Assistance Information (S-NSSAI) and for each 5G QoS Indicator (5QI), or an integer value for a number of QoS flows successfully added in PDU session modifications that are SMF initiated for each S-NSSAI and for each 5QI.

7. The apparatus of claim 1, wherein the values of the one or more counters comprise at least one of
an integer value for a number of QoS flows requested to modify in PDU session modifications that are UE initiated for each Single Network Slice Selection Assistance Information (S-NSSAI) and for each 5G QoS Indicator (5QI), or
an integer value for a number of QoS flows successfully modified in PDU session modifications that are UE initiated for each S-NSSAI and for each 5QI.

8. The apparatus of claim 1, wherein the values of the one or more counters comprise at least one of
an integer value for a number of QoS flows requested to modify in PDU session modifications that are SMF initiated for each Single Network Slice Selection Assistance Information (S-NSSAI) and for each 5G QoS Indicator (5QI), or
an integer value for a number of QoS flows successfully modified in PDU session modifications that are SMF initiated for each S-NSSAI and for each 5QI.

9. The apparatus of claim 5, wherein a counter associated with the number of QoS flows requested is incremented on transmission of a message that indicates one or more QoS flows requested to add in a PDU session modification, the message transmitted to the SMF from the AMF.

10. The apparatus of claim 5, wherein a counter associated with the number of QoS flows successfully added is incremented on transmission of a response message indicating success of a PDU session modification in reply to a message transmitted from the AMF to the SMF that indicates one or more QoS flows requested to add in the PDU session modification, the response message transmitted from the SMF to the AMF.

11. The apparatus of claim 3, wherein a counter associated with the number of failed PDU session modifications is incremented on transmission of a response message indicating failure of a PDU session modification in reply to a PDU session modification request message from the AMF to the SMF, the response message transmitted from the SMF to the AMF.

12. An apparatus of a service producer for a Session Management Function (SMF), comprising:
a memory interface; and
processing circuitry configured to execute instructions accessed via the memory interface to cause the apparatus to:
provide one or more counters, each counter associated with a category of Protocol Data Unit (PDU) session modification and a monitored message that is indicative of the category of PDU session modification;
obtain one or more raw performance measurements from the SMF by monitoring messages communicated between the SMF and an Access Management Function (AMF);
generate one or more performance measurements for the SMF by, in response to each occurrence of a monitored message, incrementing the counter associated with the monitored message,
wherein one of the one or more counters is indicative of a number of released PDU sessions that are AMF initiated; and
provide the one or more performance measurements comprising values of the one or more counters to requesting entities.

13. The apparatus of claim 12, wherein the service producer is employed by one of the SMF or another management function.

14. The apparatus of claim 12, wherein the values of the one or more counters comprise an integer value for the number of released PDU sessions that are AMF initiated.

15. The apparatus of claim 12, wherein a counter associated with the number of released PDU sessions is incremented on transmission of a PDU session release response message from the SMF to the AMF, the PDU session release response message transmitted in response to a PDU session release request message from the AMF to the SMF.

16. An apparatus of a service producer for a User Plane Function (UPF), comprising:
a memory interface; and
processing circuitry configured to execute instructions accessed via the memory interface to cause the apparatus to:
provide one or more counters, each counter associated with a category of N4 session modification and a monitored message that is indicative of the category of N4 session modification;
obtain one or more raw performance measurements from the UPF by monitoring messages communicated between the UPF and a Session Management Function (SMF) to detect occurrence of a monitored message;
generate one or more performance measurements for the UPF by, in response to each occurrence of a monitored message, incrementing the counter associated with the monitored message,
wherein respective ones of the one or more counters are indicative of values of the one or more counters of a number of N4 session establishments; and
provide the one or more performance measurements comprising values of the one or more counters to requesting entities.

17. The apparatus of claim 16, wherein the service producer is employed by one of the UPF or a management function.

18. The apparatus of claim 16, wherein the values of the one or more counters at least one of
an integer value for a number of requested N4 session establishments, or
an integer value for a number of failed N4 session establishments.

19. The apparatus of claim 18, wherein a counter associated with the number of requested N4 session establishments is incremented on receipt of a N4 session establishment request message by the UPF from the SMF.

20. The apparatus of claim 18, wherein a counter associated with the number of failed N4 session establishments is incremented on transmission of a N4 session establishment response message including a cause indicating a rejection of a N4 session establishment request message received by the UPF from the SMF, the N4 session establishment response message transmitted by the UPF to the SMF.

* * * * *